United States Patent [19]
Collins

[11] 3,754,196
[45] Aug. 21, 1973

[54] COMMUNICATIONS BRIDGE FOR IMPEDANCE MATCHING OF A PLURALITY OF LINES

[75] Inventor: James T. Collins, Kettering, Ohio

[73] Assignee: The National Cash Register Company, Dayton, Ohio

[22] Filed: Feb. 17, 1972

[21] Appl. No.: 227,141

[52] U.S. Cl. ........................ 333/8, 333/32, 179/1 C
[51] Int. Cl. .......................................... H01p 5/12
[58] Field of Search .................... 179/15 BF, 170 D, 179/16 F, 2 DP; 333/32, 8, 80; 343/860; 178/63 E

[56] References Cited

UNITED STATES PATENTS

| | | | |
|---|---|---|---|
| 1,832,452 | 11/1931 | Feldtkeller et al. | 179/170 D |
| 3,296,557 | 1/1967 | Petts et al. | 333/32 |
| 1,677,956 | 7/1928 | Dean | 333/8 |
| 2,085,434 | 6/1937 | Loftis et al. | 333/8 |
| 3,143,715 | 8/1964 | Martens | 333/8 |
| 3,237,164 | 2/1966 | Evans | 333/8 |
| 3,673,519 | 6/1972 | Van Dine | 333/8 |

*Primary Examiner*—Kathleen H. Claffy
*Assistant Examiner*—Thomas D'Amico
*Attorney*—J. T. Cavender, Albert L. Sessler, Jr. et al.

[57] ABSTRACT

This invention describes a communications coupling circuit for bidirectionally coupling a plurality of remote units through a single four wire transmission line to a central computer in a polling type data communications system. The circuit may be used with transmission lines having either a 600 ohm or a 900 ohm characteristic impedance and includes means for proper transmission line termination through the use of transformers. The circuit also utilizes resistive and inductive coupled integrated circuit operational amplifiers which provide the signal gain, filtering, feedback and impedance isolation to compensate for signal losses.

8 Claims, 3 Drawing Figures

COMMUNICATIONS BRIDGE FOR IMPEDANCE MATCHING OF A PLURALITY OF LINES

This invention relates to a couping circuit and more particularly to a circuit for coupling a plurality of remote units to a central unit through transmission lines.

With the advancement of the computer technology, it now is common for several remote terminals to apply signals to a single central computer for common processing. One manner by which this is accomplished is for the central computer to interrogate each remote terminal, one at a time. When it is finished communicating with one remote unit, it interrogates the next one, and so on. A typical arrangement of the remote units and the central computer is where there are several remote units in a close proximity to one another and a central computer some distance away. One example of this is where several teller's terminals are located at a branch bank and the central computer is in the main offices downtown. According to the prior art, each terminal communicates with the central unit over a telephone line circuit assigned thereto. Thus, if there are six remote units, it is necessary to rent six telephone lines. This type of communications network is economically wasteful, especially in view of the very limited time required for each remote unit to communicate with the central computer and the fact the central unit only communicates with one remote unit at a time.

In view of this wastefulness, it appears desirable to use one telephone line coupled to a general location in which several remote units are situated to handle the communications between each remote unit and the central computer. This, in turn, requires circuitry to control the signals and to provide the proper impedance matching to the telephone line, which may have either a 600 ohm or a 900 ohm characteristic impedance, and to insure that each signal level provided to the telephone line is within certain defined limits.

In accordance with one preferred embodiment of this invention, there is provided a multiport coupling circuit for causing the coupling through transmission lines of a central unit to a plurality of remote units in a polling type data communication system. The coupling circuit includes a pair of receive input terminals and a plurality of pairs of receive output terminals, with each pair of terminals being capable of being coupled to a transmission line having a characteristic impedance associated therewith. There is further provided a receive input transformer means, including a primary winding, a secondary winding and first impedance means. The primary winding is coupled to said pair of central receive terminals and the secondary winding is coupled to the first impedance means. The first impedance means has a value such that the effective input impedance of the primary winding is substantially the same as the characteristic impedance of the transmission line capable of being coupled to the pair at receive input terminals. The coupling circuit further includes a plurality of receive output transformer means, each including a primary winding, a secondary winding, second impedance means and isolation means. The primary winding of each receive output transformer means is coupled through the second impedance means and the isolation means included therewith to the secondary winding of the receive input transformer means, and the secondary winding of each receive output transformer means is coupled to one pair of receive output terminals. The value of each of the second impedance means is such that the effective impedance of each of the secondary windings of each receive output transformer means is substantially the same as the characteristic impedance of the transmission line capable of being coupled to the pairs of receive output terminals.

A detailed description of one embodiment of the invention is given hereinafter with specific reference being made to the following FIGURES, in which.

Figure 1:
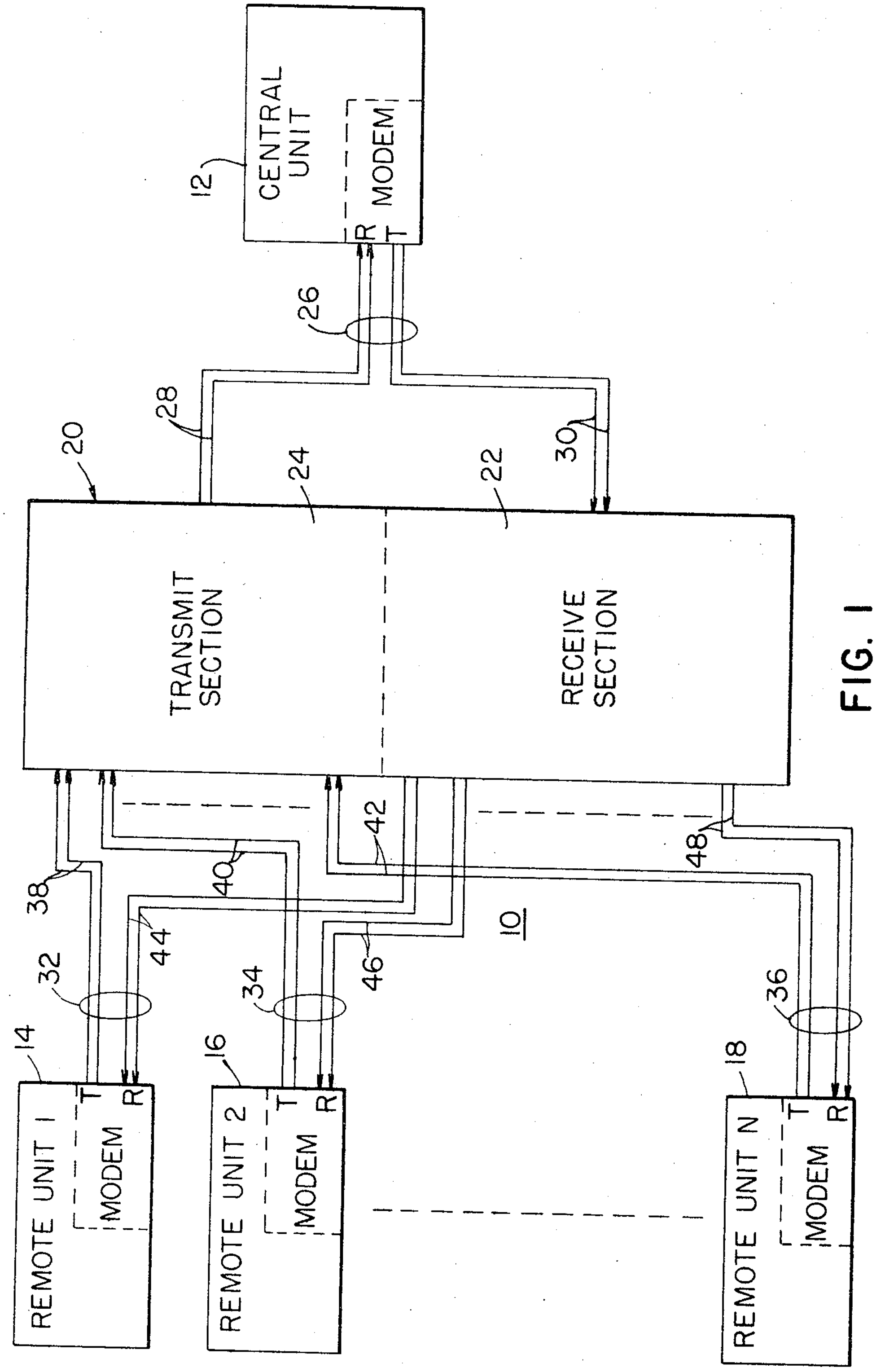
FIG. 1 is a block diagram of a polling type data communications system using this invention.

Referring now to FIG. 1, a block diagram of a polling type data communications system 10 using this invention is shown. Generally, system 10 provides a fan-out of a four wire transmission line connecting a central unit 12, such as a digital computer to a plurality of remote units 14, 16 and 18, such as teller's terminals, through a communications bridge 20. Communications bridge 20 is divided into a receive section 22 and a transmit section 24, which are shown in detail in FIGS. 2 and 3 respectively.

Central unit 12 is coupled to communication bridge 20 through a four wire telephone transmission line 26. One pair of wires 28 of the line 26 connect the transmit section 24 of communication bride 20 to a receive portion of a MODEM included within central unit 12 and the other pair of wires 30 of line 26 connect the receive section 22 of communication bridge 20 with a transmit portion of the MODEM included within central unit 12.

Similarly, each of remote units 14, 16 and 18 are connected through respective four wire transmission lines 32, 34 and 36 to communication bridge 20. Each of lines 32, 34 and 36 has a pair of twisted wires 38, 40 and 42 respectively connecting the transmit portion of a MODEM included in remote units 14, 16 and 18 to the transmit section 24 of communications bridge 20 and a pair of twisted wires 44, 46 and 48 respectively connecting the receive portion of the included MODEM to the receive section 22 of communications bridge 20.

The operation of system 10 will now be explained. When central unit 12 desires to communicate with one of remote terminals 14, 16 or 18, it sends a frequency shift key (FSK) signal representing a digital message on wires 30 to the receive section 22 of communication bridge 20. The initial digital message includes a polling code which specifies one of the remote units 14, 16 and 18. As will be shown in FIG. 2, circuitry included in receive section 22 couples the signal applied over wires 30 to each of wires 44, 46 and 48 and to the receive portion of the MODEMS of remote units 14, 16 and 18. Further included within each of the remote terminals 14, 16 and 18 is decoding circuitry (not shown) which decodes the polling code of the signal and only that particular remote unit being polled responds to the signal applied thereto over wires 44, 46 and 48.

The one responding remote unit will provide an FSK transmit signal over the one of wires 38, 40 or 42 connected thereto to transmit section 24. As will be described in detail in FIG. 3, this signal is coupled to wires 28 and then to central unit 12. In this manner, central unit 12 and one of remote terminals 14, 16 or 18 communicate; when a different remote unit is to be polled, a different polling code is sent over wires 30 and a different remote unit responds.

Figure 2:
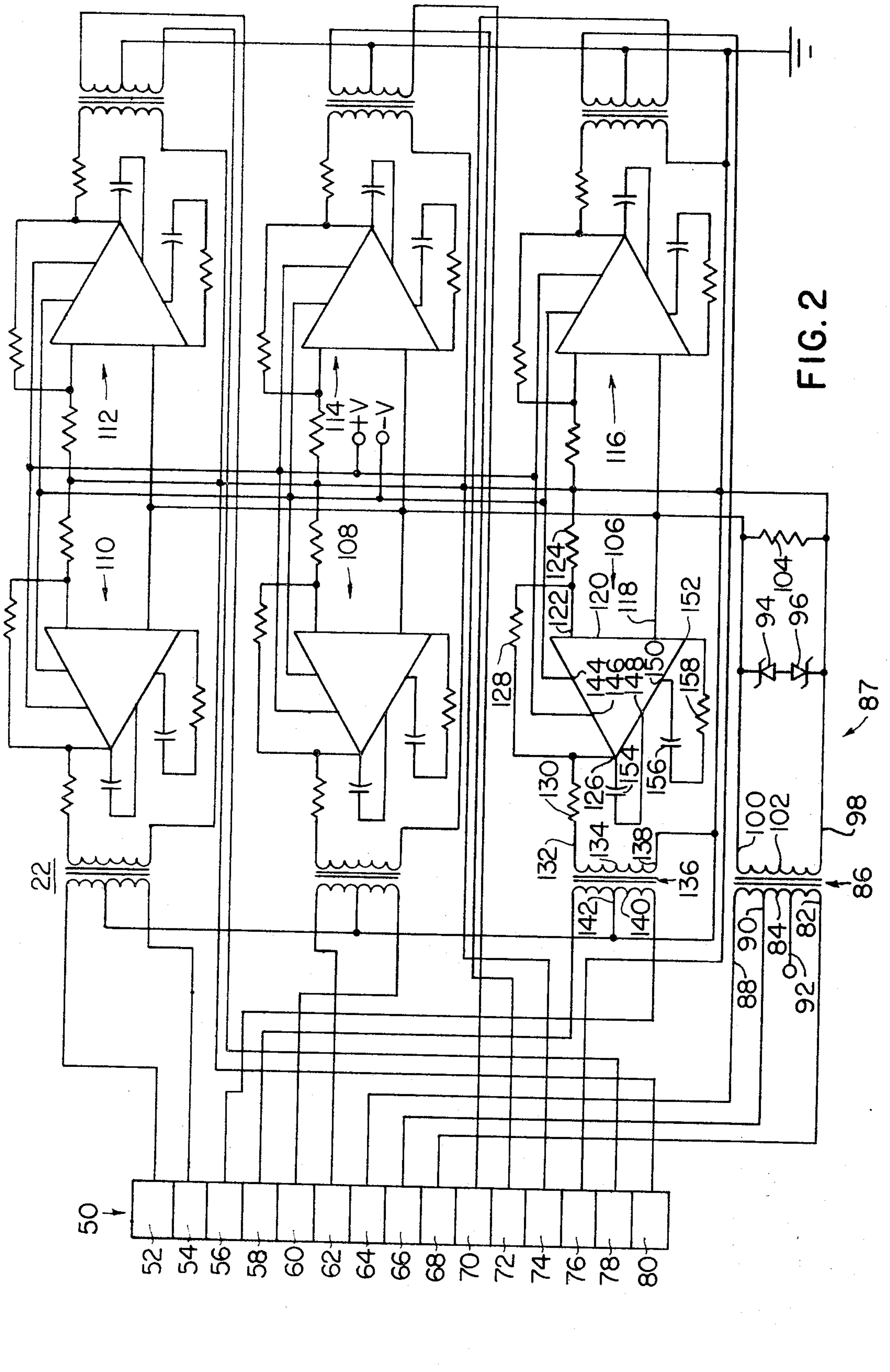
FIG. 2 is a circuit diagram of the receive section of this invention.

Referring now to FIG. 2, the details of receive section 22 will now be explained for a communications bridge capable of coupling six remote units to a central unit. It should be understood that any number of remote terminals can be coupled in a similar manner. A 15 terminal connector 50 having individual terminals 52, 54, 56, 58, 60, 62, 64, 66, 68, 70, 72, 74, 76, 78, and 80 is included in receive section 22 for connection to the wires of the transmission lines carrying signals from central unit 12 to remote units 14, 16 and 18. The two transmission wires 30 carrying the signal transmitted by the central unit 12 are connected between terminal 68 and one of either terminal 64 or 66, depending upon the characteristic impedance of these wires, such that for a 900 ohm line, terminal 64 is used and for a 600 ohm line, terminal 66 is used. The remaining terminals of connector 50 are coupled to the transmission wires used to carry the signal from receive section 22 to the receive portion of the MODEMS included in the remote units, such as wires 44, 46 and 48 of FIG. 1. For instance, the two wires 44 may be coupled to terminals 52 and 54, the two wires 46 may be coupled to terminals 56 and 58, and the two wires 48 may be coupled to terminals 78 and 80. Similarily wires to three other remote units (not shown) are coupled to terminals 60 and 62, 70 and 72, and 74 and 76.

Terminal 68 of connector 50 is connected to one end 82 of primary winding 84 of receive input transformer 86 in receive input circuit 87. Similarly terminal 64 is connected to the other end 88 of primary winding 84. Terminal 66 of connector 50 is connected to a tap 90 of primary winding 84 which may be located two-thirds way between end 82 and end 88 of primary winding 84. A second tap 92 is also provided to be coupled to reference potential, if desired, and is located midway between end 82 and tap 90.

The cathodes of zener diodes 94 and 96 are coupled to the two ends 98 and 100 respectively of secondary winding 102 and the anodes of diodes 94 and 96 are coupled together. Diodes 94 and 96 act as protection devices by limiting the voltage across secondary winding 102 to their breakdown voltage. Resistor 104 is connected between ends 98 and 100 of secondary winding 102. In addition, end 98 of secondary winding 102 is connected to a point of reference potential, such as ground. The value of resistor 104 and the design of transformer 86, such as the turns ratio and secondary winding 102 impedance, are chosen so that a 600 ohm impedance appears between end 82 and tap 90 of primary winding 84 and a 900 ohm impedance appears between ends 82 and 88 of primary winding 84. This allows the proper termination of a 600 ohm transmission line connected between terminals 66 and 68 of connector 50 or a 900 ohm transmission line connected between terminals 64 and 68 of connector 50.

The end 100 of secondary winding 102 is also connected to six identical receive output circuits 106, 108, 110, 112, 114, and 116. Only circuit 106 will be described in detail, it being understood that the remaining circuits are identical. Specifically, end 100 is connected to one input 118 of a high performance integrated circuit operational amplifier 120, such as the MC 1709 device produced by Motorola Semiconductor Products, Inc. The other input 122 of operational amplifier 120 is connected through input resistor 124 to ground. The output 126 of operational amplifier 120 is coupled through feedback resistor 128 to input 122. Circuit 106 provides signal gain, filtering, feedback and impedance isolation.

The output 126 of operational amplifier 120 is also coupled through impedance matching resistor 130 to one end 132 of the primary winding 134 of receive output transformer 136, the other end 138 being connected to ground. The secondary winding 140 of transformer 136 is connected between terminals 56 and 58 of connector 50. A center tap 142 of secondary winding 140 is connected to ground. The design of transformer 136, such as the turns ratio and primary winding impedance, and the value of resistor 130 are chosen so that secondary winding 140 appears as a 600 ohm effective impedance. In this manner, the 600 ohm transmission line connecting a remote unit to terminals 56 and 58 is properly terminated. It is not necessary to provide duel termination for the transmission line connected between receive section 22 and the remote units 14, 16 and 18 because 600 ohm transmission line can be always used, since this is under the control of the user, while the characteristic impedance of telephone lines is not.

Operational amplifier 120 has five additional pins 144, 146, 148, 150 and 152. A positive DC supply voltage is applied to pin 146 and a negative DC supply voltage is applied to pin 144. Output 126 is coupled through capacitor 154 to pin 148 and pin 150 is coupled through series-connected capacitor 156 and resistor 158 to pin 152. The values of capacitors 154 and 156 and resistor 158 are chosen to cause a proper frequency response of operational amplifier 120. The values of feedback resistor 128 and current limiting input resistor 124 are chosen to cause the gain of operational amplifier 120 to be just enough to compensate for signal losses in receive section 22, resulting in unity gain for receive section 22.

With the exception of the connection of the secondary winding corresponding to secondary winding 140 to connector 50, the circuits, 108, 110, 112, 114, and 116 are identical to circuit 106. The secondary winding of circuit 108 is connected between terminals 60 and 62; the secondary winding of circuit 110 is connected between terminals 52 and 54; the secondary winding of circuit 112 is connected between terminals 78 and 80; the secondary winding of circuit 114 is connected between terminals 70 and 72; and the secondary winding of circuit 116 is connected between terminals 74 and 76.

The operation of receive section 22 will now be described. A FSK signal is applied over transmission wires 30 to either terminals 66 and 68 or terminals 64 and 68, depending upon whether wires 30 have a 600 ohm or a 900 ohm characteristic impedance respectively. From there, the signal is transformer coupled through receive input transformer 86 to the operational amplifiers of each of circuits 106, 108, 110, 112, 114 and 116 such as operational amplifier 120. From these amplifiers, the signal is amplified and transformer coupled through the receive output transformers, such as transformer 136, to each of terminals 52 and 54, 56 and 58, 60 and 62, 70 and 72, 74 and 76 and 78 and 80 and through 600 ohm transmission lines coupling each of these terminal pairs to the six remote units.

Figure 3:
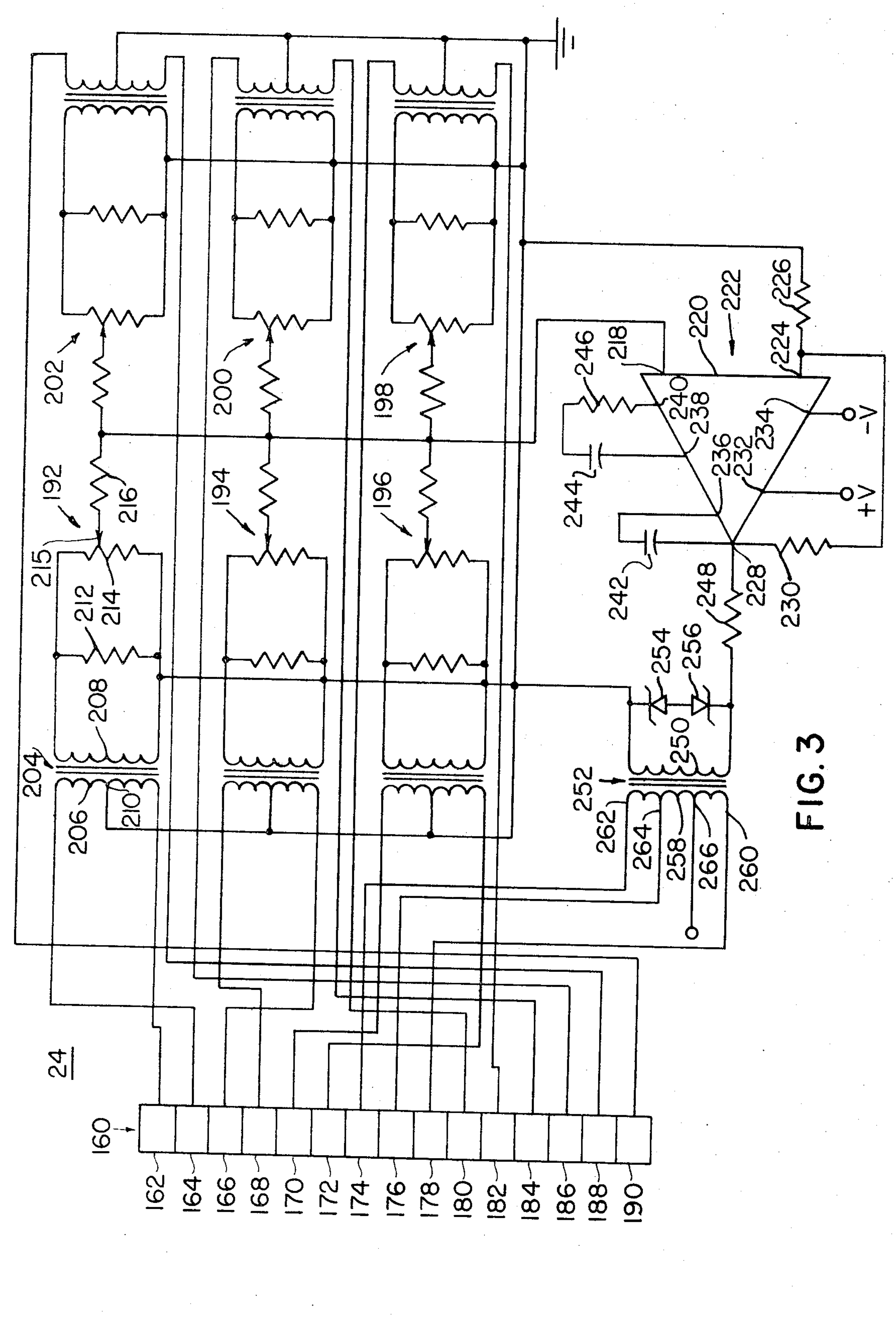
FIG. 3 is a circuit diagram of the transmit section of this invention.

Referring now to FIG. 3, there is shown the transmit portion 24 of communication bridge 20. Transmit portion also includes a 15 terminal connector 160 having individual terminals 162, 164, 166, 168, 170, 172, 174, 176, 178, 180, 182, 184, 186, 188, and 190. Two wires of a four wire transmission line, such as wires 38, 40, and 42 in FIG. 1, from each of six remote units, are coupled between each of terminal pairs 162 and 164, 166 and 168, 170 and 172, 180 and 182, 184 and 186 and 188 and 190. If the transmission wires between connector 160 and central unit 12 have a 600 ohm characteristic impedance, they will be coupled between terminals 176 and 178 and if they have a 900 ohm characteristic impedance, they will be coupled between terminals 174 and 178.

Connected to each of terminals 162 and 164, 166 and 168, 170 and 172, 180 and 182, 184 and 186 and 188 and 190 is a respective transmit input circuit 192, 194, 196, 198, 200, and 202. Each of circuits 192, 194, 196, 198, and 202 is identical and only circuit 192 will be described in detail, it being understood that the remaining circuits 194, 196, 198, 200 and 202 are of similar construction.

Circuit 192 includes transmit input transformer 204 having primary winding 206 and secondary winding 208. Primary winding 206 is coupled between terminals 162 and 164 of connector 160. A center tap 210 of primary winding 206 is connected to ground. One end of secondary winding 208 is connected to the junction of resistor 212 and an end terminal of potentiometer 214, the other end of secondary winding 208, resistor 212 and potentiometer 214 being connected together, and to ground. The wiper arm 215 of potentiometer 214 is connected to isolation resistor 216. The values of resistor 212, the end-to-end resistance of potentiometer 214 and the design of transformer 204, such as the turns ratio and the impedance of secondary winding 208, are selected so that primary winding 206 appears as 600 ohm impedance. The value of resistor 216 is large, so the setting of the wiper arm 215 of potentiometer 214 will have little loading effect on the other circuits 194, 196, 198, 200 and 202.

Each of the isolation resistors of circuits 192, 194, 196, 198, 200 and 202, such as resistor 216, are connected together and to one input 218 of a high input impedance operational amplifier 220 in transmit output circuit 222. The other input 224 of operational amplifier 220 is connected through input resistor 226 to ground. The output 228 of operational amplifier 220 is connected through feedback resistor 230 to input 224 thereof. The value of resistors 226 and 230 are selected to cause operational amplifier 220 to significantly amplify the signal applied to input 218 thereof in anticipation of its being transmitted to central unit 12 in order to compensate for the losses in the transmission lines coupling transmit section 24 to central unit 12. The wiper arm 215 of potentiometer 214 is set to cause equal magnitude signals to be provided to input 218 of operational amplifier 220 from each of circuits 192, 194, 196, 198, 200 and 202. Operational amplifier 220 further includes five other pins 232, 234, 236, 238 and 240 with pins 232 and 234 being coupled to respective positive and negative DC power sources. Output 228 is coupled through capacitor 242 to pin 236 and pin 238 is coupled through serially connected capacitor 244 and resistor 246 to pin 240. The values of capacitors 242 and 244 and resistor 246 are selected to provide the proper frequency response for operational amplifier 220.

Output 228 is also coupled through resistor 248 to one end of the primary winding 250 of transmit output transformer 252, the other end of primary winding 250 being connected to ground. Also connected to the two ends of primary winding 250 are the cathodes of zener diodes 254 and 256, the anodes of which are connected together. This provides current surge protection for transformer 252. Secondary winding 258 of transformer 252 is similar to the primary winding of receive input transformer 86 shown in FIG. 2, that is, the two end terminals 260 and 262 thereof are connected to respective terminals 178 and 174 of connector 160, one tapped terminal 264 is connected to terminal 176 of connector 160, and a second tapped terminal 266 is left unconnected, but may be connected to ground, if desired. The value of resistor 248 and design of transformer 252 such as the turns ratio and primary winding impedance are selected so that secondary winding 258 appears as a 900 ohm impedance between ends 260 and 262 and as a 600 ohm impedance between end 260 and tap 264.

The operation of transmit section 24 will not be explained. An FSK signal from only one of remote units 14, 16 or 18 is applied through the 600 ohm transmission line 38, 40 or 42 to two terminals of connector 160. Assuming this signal is applied between terminals 162 and 164, it is then transformer coupled through transformer 204, voltage divided by potentiometer 214, and then applied to operational amplifier 220. Transformer 204 also properly terminates the transmission line. The signal is then amplified and applied through transformer 252, which provides proper impedance matching for either a 600 ohm or 900 ohm transmission line, to the transmission line connected between either terminals 174 and 178 or terminals 176 and 178 of connector 160 and then to central unit 12.

It should be noted that the above description is for transmission lines having either a 600 ohm or a 900 ohm characteristic impedance connecting communications bridge 20 to central unit 12 and for transmission lines having a 600 ohm characteristic impedance connecting the remote terminals to communications bridge 20. For transmission lines having other characteristic impedances, one merely changes the values of certain components which previously have been stated to be selected for impedance matching purposes.

One circuit known to operate for an FSK signal of either 1,200 hertz or 2,200 hertz uses the following components:

| | | |
|---|---|---|
| Resistor | 104 | 536 ohm |
| Resistor | 124 | 10,000 ohm |
| Resistor | 128 | 18,200 ohm |
| Resistor | 130 | 536 ohm |
| Resistor | 158 | 1,500 ohm |
| Resistor | 212 | 1,820 ohm |
| Potentiometer | 214 | 1,000 ohm |
| Resistor | 216 | 10,000 ohm |
| Resistor | 226 | 1,000 ohm |
| Resistor | 230 | 16,500 ohm |
| Resistor | 246 | 1,500 ohm |
| Resistor | 248 | 536 ohm |
| Capacitor | 154 | 25 pf |
| Capacitor | 156 | 500 pf |
| Capacitor | 242 | 25 pf |
| Capacitor | 244 | 500 pf |
| Diode | 94 | 5.1 V, 400 MW |
| Diode | 96 | 5.1 V, 400 MW |
| Diode | 254 | 5.1 V, 400 MW |
| Diode | 256 | 5.1 V, 400 MW |

What is claimed is:

1. A multiport bidirectional coupling circuit for causing the coupling through transmission lines of a central unit to a plurality of remote units in a polling type data communication system comprising:

a pair of receive input terminals and a plurality of pairs of receive output terminals, each pair of said terminals being capable of being coupled to a transmission line having a characteristic impedance associated therewith;

a receive input transformer means including a primary winding, a secondary winding and first impedance means, said primary winding being coupled to said pair of receive input terminals, said secondary winding being coupled to said first impedance means, said first impedance means being of such value that the effective input impedance of said primary winding is substantially the same as the characteristic impedance of said transmission line capable of being coupled to said receive input terminals;

a plurality of receive output transformer means, each including a primary winding, a secondary winding, second impedance means and the primary winding of each receive output transformer means being coupled through said second impedance means and said isolation means included therewith to said secondary winding of said receive input transformer means, and the secondary winding of each receive output transformer means being coupled to one pair of receive output terminals, the value of each of said second impedance means being such that the effective impedance of said secondary windings of each receive output transformer means is substantially the same as the characteristic impedance of the transmission line capable of being coupled to said pairs of receive output terminals;

a pair of transmit output terminals and a plurality of pairs of transmit input terminals, each pair of said terminals being capable of being coupled to a transmission line which has a characteristic impedance associated therewith;

a transmit output transformer means including a primary winding, a secondary winding, and third impedance means, the primary winding of said transmit output transformer means being coupled to said third impedance means, the secondary winding of said transmit output transformer means being coupled to said pair of transmit output terminals, said third impedance means being of such value that the effective input impedance of the secondary winding of said transmit output transformer means is substantially the same as the characteristic impedance of the transmission line capable of being coupled to said pair of transmit output terminals; and a plurality of transmit input transformer means, each including a primary winding, a secondary winding, and fourth impedance means, the primary winding of each of said transmit input transformer means being coupled to one of said pairs of transmit input terminals the secondary winding of each of said transmit input transformer means being coupled to said fourth impedance means such that said fourth impedance means furnishes isolation between the transmit input transformer means within which it is included and the other transmit input transformer means, said coupling circuit further including means for coupling said third and fourth impedance means, the value of said fourth impedance means being such that the effective input impedance of said primary winding included within that transmit input transformer means is substantially the same as the characteristic impedance of the transmission line capable of being coupled thereto;

said fourth impedance means including first and second resistors and a potentiometer, said potentiometer having two end terminals and a wiper arm; said first resistor being coupled in parallel with said secondary winding, the end terminals of said potentiometer being coupled in parallel with said first resistor, and said wiper arm of said potentiometer being coupled to one end of said second resistor, said means for coupling said third and fourth impedance means connecting the other end of said second resistor through said third impedance means to the secondary winding of said transmit output transformer means, the values of said first resistor, said second resistor and the resistance of said potentiometer between said end terminals thereof being such that said second resistor acts as an isolation resistance and said effective input impedance of said primary winding of each transmit input transformer is dependent upon the combination of said first resistor and said potentiometer.

2. The invention according to claim 1 wherein said wiper arm of said potentiometer is adjusted to cause a predetermined amount of current to be provided through said second resistor.

3. The invention according to claim 2 wherein said means for coupling said third and fourth impedance means includes amplifying means.

4. The invention according to claim 3:

wherein the transmission lines capable of being coupled to said receive input terminals and said transmit output terminals form a four wire telephone transmission line;

wherein the characteristic impedance of the transmission lines capable of being coupled to said pair of receive input terminals and said pair of transmit output terminals may be either a first value or a second value;

wherein said primary winding of said receive input transformer means includes first, second and third terminals, at least said second terminal being a tapped terminal, said first and second terminals being coupled to said pair of receive input terminals in the event said characteristic impedance of the transmission line capable of being coupled thereto is said first value, and said first and third terminals being coupled to said pair of receive input terminals in the event said characteristic impedance of the transmission line capable of being coupled thereto is said second value; and wherein said secondary winding of said transmit output transformer means includes first, second and third terminals, at least said second terminal being a tapped terminal, said first and second terminals being coupled to said pair of transmit output terminals in the event said characteristic impedance of the transmission line capable of being coupled thereto is said first value, and said first and third terminals being coupled to said pair of transmit output terminals in the event said characteristic impedance of the transmission line capable of being coupled thereto is said second value.

5. The invention according to claim 4 wherein said isolation means includes amplifying means having a high input impedance and a gain sufficient to cause the signal applied to said receive output terminals to have substantially the same magnitude as the signal applied to said input terminals.

6. A multiport coupling circuit for effecting the coupling through transmission lines of a plurality of remote units to a central unit comprising:

a pair of transmit output terminals and a plurality of pairs of transmit input terminals, each pair of said terminals being capable of being coupled to a transmission line which has a characteristic impedance associated therewith;

transmit output transformer means including a primary winding, a secondary winding, and first impedance means, said primary winding being coupled to said first impedance means, said secondary winding being coupled to said pair of transmit output terminals, said first impedance means being of such value that the effective input impedance of said secondary winding is substantially the same as the characteristic impedance of the transmission line capable of being coupled to said pair of transmit output terminals; and a plurality of transmit input transformer means, each including a primary winding, a secondary winding, and second impedance means, the primary winding of each transmit input transformer means being coupled to one of said pairs of transmit input terminals, the secondary winding of each transmit input transformer means being coupled to said second impedance means, said circuit further including means for coupling said first and second impedance means, the value of said second impedance means being such that the effective input impedance of the primary winding of each transmit input transformer means is substantially the same as the characteristic impedance of the transmission line capable of being coupled thereto;

said second impedance means includes first and second resistors and a potentiometer, said potentiometer having two end terminals and a wiper arm, said first resistor being coupled in parallel with said secondary winding, the end terminals of said potentiometer being coupled in parallel with said first resistor, and said wiper arm of said potentiometer being coupled to one end of said second resistor, said means for coupling said first and second impedance means conneting the other end of said second resistor through said first impedance means to the secondary winding of said transmit output transformer means, the values of said first resistor, said second resistor and the resistance of said potentiometer between said end terminals being such that said second resistor acts as an isolation resistance and said effective input impedance of said primary winding of each transmit input tranformer is dependent upon the combination of said first resistor and said potentiometer resistance.

7. The invention according to claim 6 wherein said wiper arm of said potentiometer is adjusted to cause a predetermined amount of current to be provided through said second resistor.

8. The invention according to claim 7 wherein said means for coupling said first and second impedance means includes amplifying means.

* * * * *